United States Patent
Blaney et al.

(10) Patent No.: US 10,920,600 B2
(45) Date of Patent: Feb. 16, 2021

(54) INTEGRATED SEAL AND WEAR LINER

(71) Applicant: United Technologies Corporation, Farmington, CT (US)

(72) Inventors: Ken F. Blaney, Middleton, NH (US); Paul M. Lutjen, Kennebunkport, ME (US); Thomas E. Clark, Sanford, ME (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 176 days.

(21) Appl. No.: 16/122,553

(22) Filed: Sep. 5, 2018

(65) Prior Publication Data
US 2020/0072071 A1    Mar. 5, 2020

(51) Int. Cl.
F01D 11/08    (2006.01)

(52) U.S. Cl.
CPC .......... *F01D 11/08* (2013.01); *F05D 2230/54* (2013.01); *F05D 2240/11* (2013.01); *F05D 2260/30* (2013.01); *F05D 2300/17* (2013.01); *F05D 2300/6033* (2013.01)

(58) Field of Classification Search
CPC ........ F01D 11/08; F01D 11/12; F01D 11/122; F01D 11/125; F01D 11/127; F05D 2240/11
See application file for complete search history.

(56) References Cited

U.S. PATENT DOCUMENTS

| | | | |
|---|---|---|---|
| 5,988,975 A | 11/1999 | Pizzi | |
| 6,076,835 A | 6/2000 | Ress et al. | |
| 6,942,445 B2 * | 9/2005 | Morris | F01D 9/04 415/1 |
| 7,217,089 B2 | 5/2007 | Durocher et al. | |
| 8,119,247 B2 * | 2/2012 | Kirby | C04B 41/009 416/241 B |
| 9,708,922 B1 | 7/2017 | Davis | |
| 10,138,734 B2 * | 11/2018 | Jaureguiberry | F01D 5/04 |
| 2014/0241874 A1 | 8/2014 | Rioux | |
| 2016/0245108 A1 | 8/2016 | Sippel | |
| 2018/0016943 A1 | 1/2018 | Lefebvre et al. | |

FOREIGN PATENT DOCUMENTS

WO    9853228    11/1998

OTHER PUBLICATIONS

EP Search Report from EP Application No. 19195726.5 dated Dec. 20, 2019.

\* cited by examiner

*Primary Examiner* — Nathaniel E Wiehe
*Assistant Examiner* — Brian O Peters
(74) *Attorney, Agent, or Firm* — Carlson, Gaskey & Olds, P.C.

(57) ABSTRACT

A blade outer air seal assembly includes a support structure. A blade outer air seal extends circumferentially about an axis and is mounted in the support structure. The blade outer air seal has a lip at an axial end engaged with the support structure. A seal structure has a seal portion and a wear liner portion joined by a radially extending portion. The seal portion is radially outward of the lip and the wear liner is radially inward of the lip.

18 Claims, 5 Drawing Sheets

INTEGRATED SEAL AND WEAR LINER

BACKGROUND

This application relates to an integrated seal and wear liner for a blade outer air seal.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

SUMMARY

In one exemplary embodiment, a blade outer air seal assembly includes a support structure. A blade outer air seal extends circumferentially about an axis and is mounted in the support structure. The blade outer air seal has a lip at an axial end engaged with the support structure. A seal structure has a seal portion and a wear liner portion joined by a radially extending portion. The seal portion is radially outward of the lip and the wear liner is radially inward of the lip.

In a further embodiment of any of the above, the support structure has a support member configured to engage the lip of the blade outer air seal.

In a further embodiment of any of the above, the support member is a radially innermost portion of the support structure.

In a further embodiment of any of the above, the wear liner portion is generally flat and arranged between the support member and the lip.

In a further embodiment of any of the above, the seal portion has a wavy shape that is compressed between the support structure and the lip.

In a further embodiment of any of the above, the seal portion has a relaxed height that is greater than an installed height when the seal portion is installed between the support structure and the blade outer air seal.

In a further embodiment of any of the above, the seal portion has at least two radially outermost points that are in contact with the support structure.

In a further embodiment of any of the above, the radially extending portion is positioned aft of the blade outer air seal.

In a further embodiment of any of the above, the seal portion extends forward from the radially extending portion a first distance that is greater than a second distance that the wear liner extends forward from the radially extending portion.

In a further embodiment of any of the above, the radially extending portion is generally flat and engages a surface of the support structure.

In a further embodiment of any of the above, a flow guide is arranged radially outward of the blade outer air seal.

In a further embodiment of any of the above, the seal portion is arranged between the support structure and the flow guide.

In a further embodiment of any of the above, the seal portion is in contact with the flow guide.

In a further embodiment of any of the above, the seal portion has two radially outermost points that are in contact with the support structure. An inner point is in contact with the flow guide between the two radially outermost points.

In a further embodiment of any of the above, the blade outer air seal has a hook near a second axial end. The flow guide has a flow guide hook and flow guide lip that engage with the blade outer air seal hook and blade outer air seal lip.

In a further embodiment of any of the above, a spacer is positioned between the flow guide and the blade outer air seal to maintain a gap between the flow guide and the blade outer air seal.

In a further embodiment of any of the above, the blade outer air seal is a monolithic ceramic material.

In a further embodiment of any of the above, the blade outer air seal is a ceramic matrix composite material.

In a further embodiment of any of the above, the seal structure is formed from sheet metal.

In a further embodiment of any of the above, the seal structure is a cobalt alloy.

These and other features may be best understood from the following drawings and specification.

DETAILED DESCRIPTION

Figure 1:
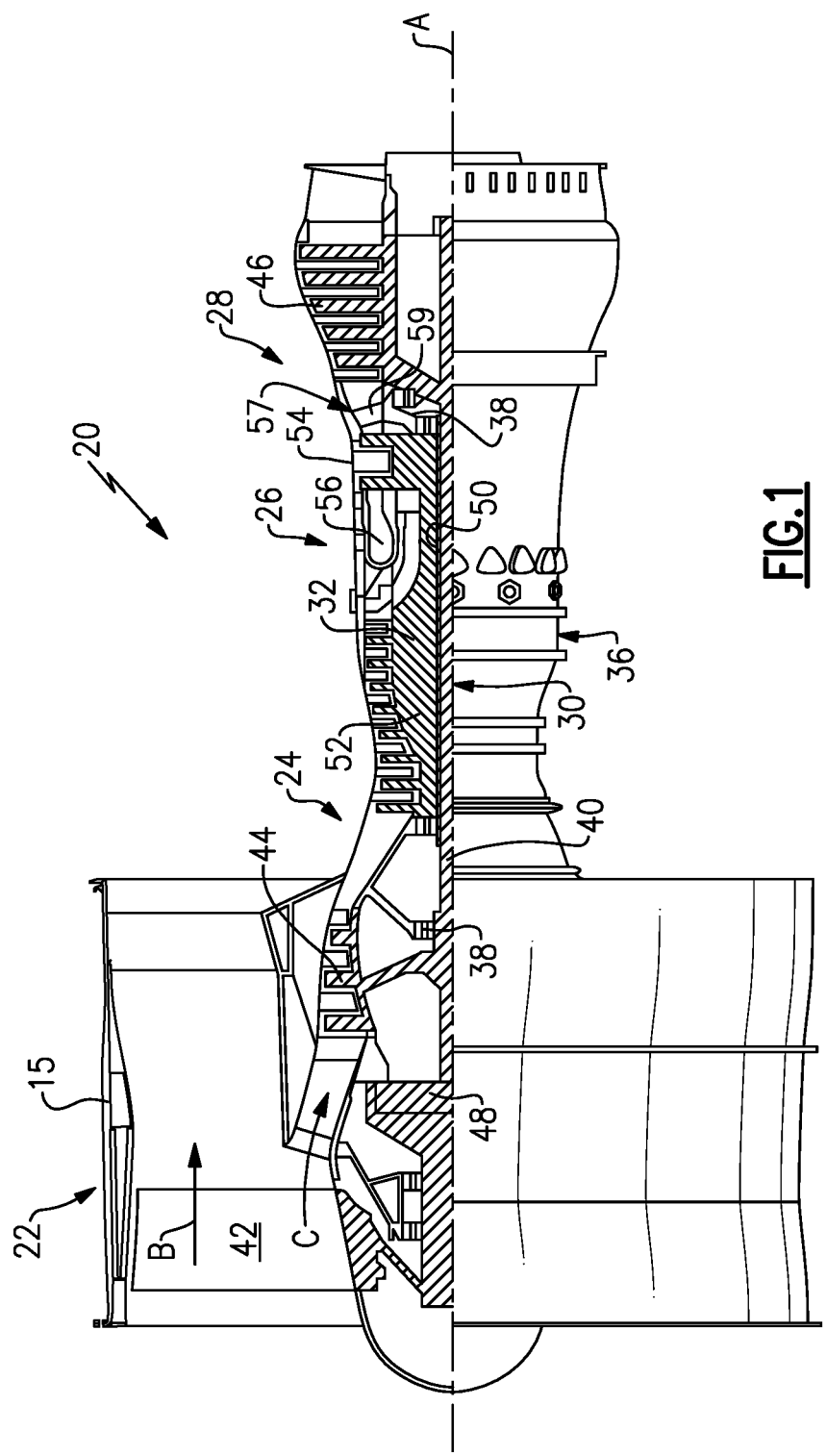
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
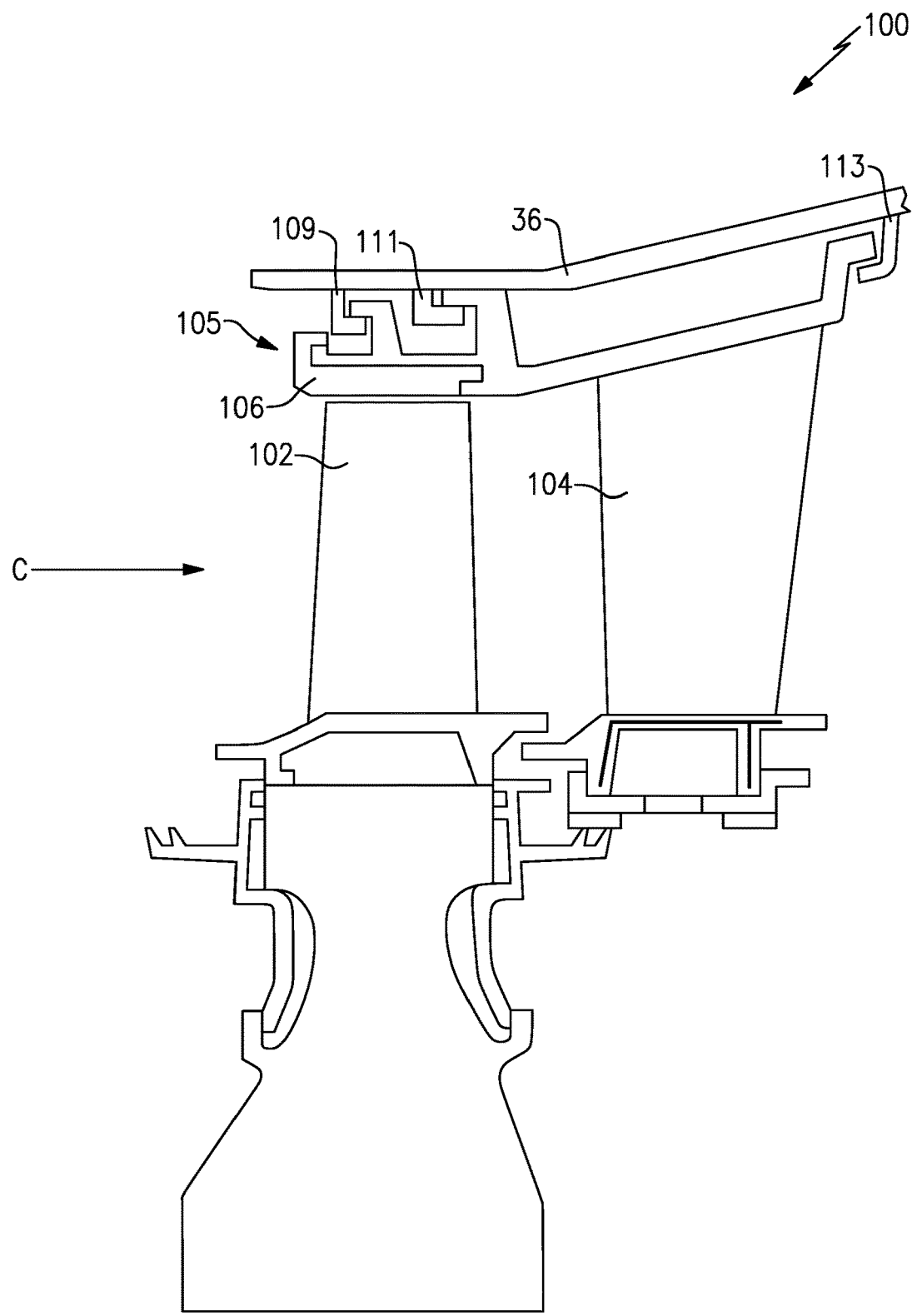
FIG. 2 schematically shows a portion of a turbine section.

FIG. 2 schematically illustrates a portion 100 of the turbine section 28. The portion 100 includes alternating series of rotating blades 102 and stationary vanes 104 that extend into the core flow path C of the gas turbine engine. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades. Thus, an assembly 105 having a blade outer air seal ("BOAS") 106 is positioned slightly radially outwardly of the outer tip of the blades 102. It should be understood that the turbine section portion 100 could be utilized in other gas turbine engines, and even gas turbine engines not having a fan section at all.

The BOAS assembly 105 is attached to the engine static structure 36. The engine static structure 36 has a plurality of engagement features 109, 111, 113 for engagement with the BOAS assembly 105. In an embodiment, engagement features 109 and 111 are at an axial position between leading and trailing edges of the blade 102 and engagement feature 113 is aft of the vane 104. In another embodiment, engagement feature 111 is between the blade 102 and vane 104. Fewer or additional engagement features may be contemplated within the scope of this disclosure.

Figure 3:
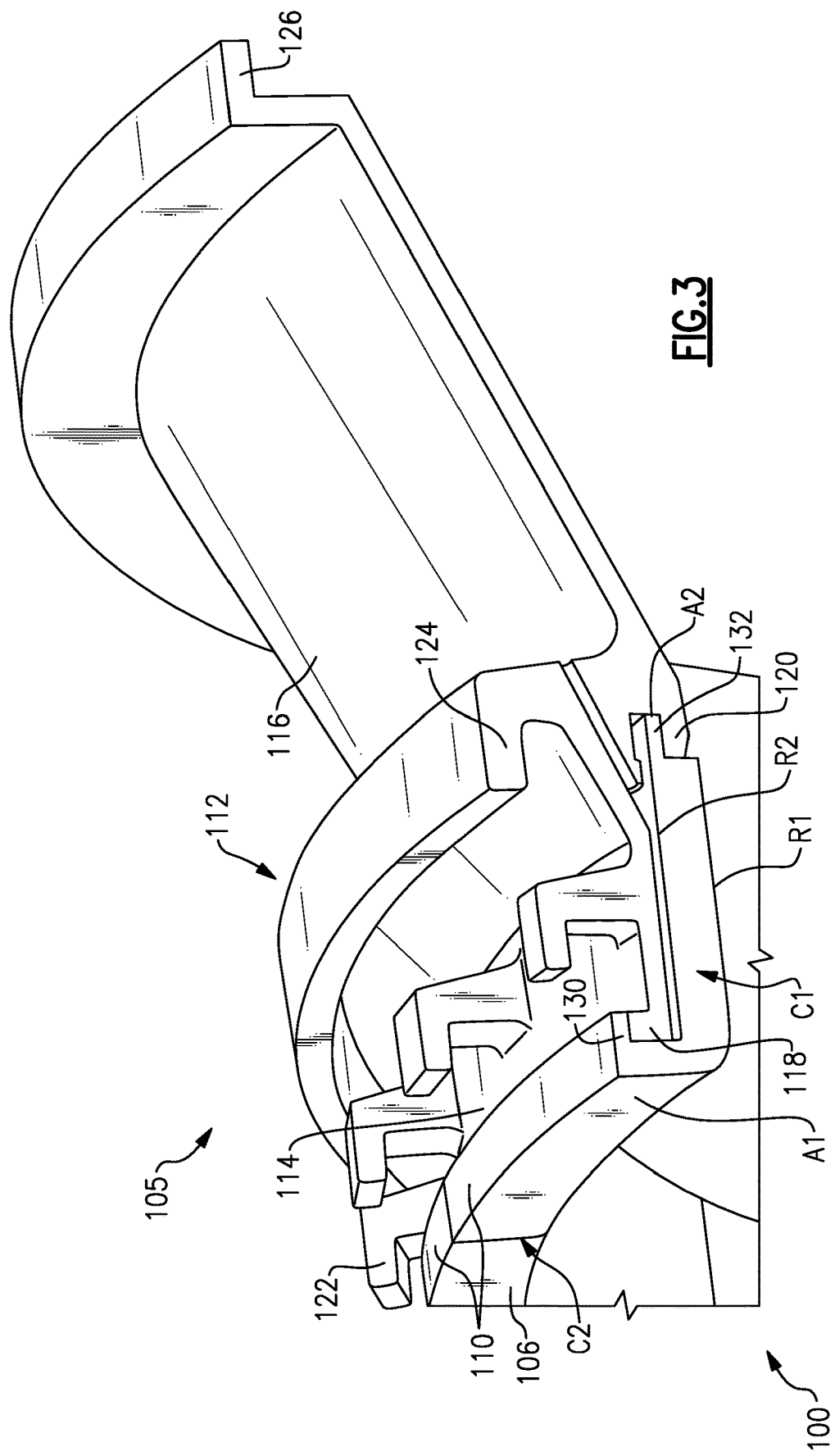
FIG. 3 shows a blade outer air seal assembly.

FIG. 3 illustrates the BOAS assembly 105. The assembly 105 includes the BOAS 106, which is made up of a plurality of seal segments 110 that are circumferentially arranged in an annulus around the central axis A of the engine 20. The seal segments 110 are mounted in a structure 112, which is circumferentially continuous about the central axis A. The BOAS 106 is in close radial proximity to the tips of the blades 102 to reduce the amount of gas flow that escapes around the blades 102.

The seal segments 110 may be monolithic bodies that are formed of a high thermal-resistance, low-toughness material, such as a ceramic matrix composite. In another embodiment, the seal segments 110 may be formed from another material, such as a metallic alloy or monolithic ceramic. BOAS seals that are ceramic matric composite, particularly 2D ply construction, may be difficult to mount in an engine. This disclosure may also apply to 3D and 4D ceramic matrix composite construction methods. The parts are designed so that the thermal expansion in the axial direction can more easily work with other part with different thermal expansion rations.

Each seal segment 110 is a body that defines radially inner and outer sides R1, R2, respectively, first and second circumferential ends C1, C2, respectively, and first and second axial sides A1, A2, respectively. The radially inner side R1 faces in a direction toward the engine central axis A. The radially inner side R1 is thus the gas path side of the seal segment 110 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

The seal segments 110 are mounted in the structure 112, which includes a BOAS support portion 114 and a vane platform portion 116. The BOAS support portion 114 includes a first support member 118 that radially supports a hook 130 on the seal segment 110 at an axially forward portion of the structure 114 and a second support member 120 that radially supports a lip 132 on the seal segment 110 at an axially aft portion of the seal segment 110. The first support member 118 is the axially forward-most end of the structure 112. In an embodiment, the second support member 120 is the radially innermost portion of the structure 112.

The structure 112 may include a plurality of hooks for attachment to the engine static structure 36. For example, the structure 112 may include a plurality of discrete hooks 122 extending radially outward from the BOAS support portion 114. The hooks 122 engage the engagement feature 109 (shown in FIG. 2). The structure 112 may include a continuous hook structure aft of the BOAS 106. In the illustrated embodiment, an attachment member 124 extends radially outward from the structure 112 for attachment to the engine 20. The attachment member 124 may be at the same axially position as the second support member 120, or may forward or aft of the second support member 120. The attachment member 124 engages the engagement feature 111 (shown in FIG. 2). A vane platform attachment member 126 extends radially outward from the vane platform portion 116.

In the illustrated embodiment, the vane platform attachment member 126 is axially aft of the vane 104. The vane platform attachment member 126 may be the radially outermost portion of the structure 112. The attachment member 126 engages the engagement feature 113 (shown in FIG. 2). Each of the attachment members 122, 124, 126 has a generally radially extending portion and a generally axially extending portion. Although three attachment members 122, 124, 126 and three engagement members 109, 111, 113 are shown, more or fewer may come within the scope of this disclosure.

In this embodiment, the BOAS support portion 114 and vane platform portion 116 form a unified part. The metallic vane platform portion 116 may be used in conjunction with a CMC vane 104, so that the vane construction is multi-piece in nature. The BOAS support portion 114 is joined with the vane platform portion 116 to allow the architecture to seal more easily and use cooling air more efficiently. This architecture allows BOAS cooling air reuse so the cooling air can be used on an adjacent vane. Although a unified BOAS support portion 114 and vane platform portion 116 is illustrated, the disclosed assembly may be used in a BOAS support that is not integrated with a vane platform. Details of a support structure 112 are found in U.S. patent application Ser. No. 16/122,373, entitled "UNIFIED BOAS SUPPORT AND VANE PLATFORM" filed on even date herewith.

Figure 4:
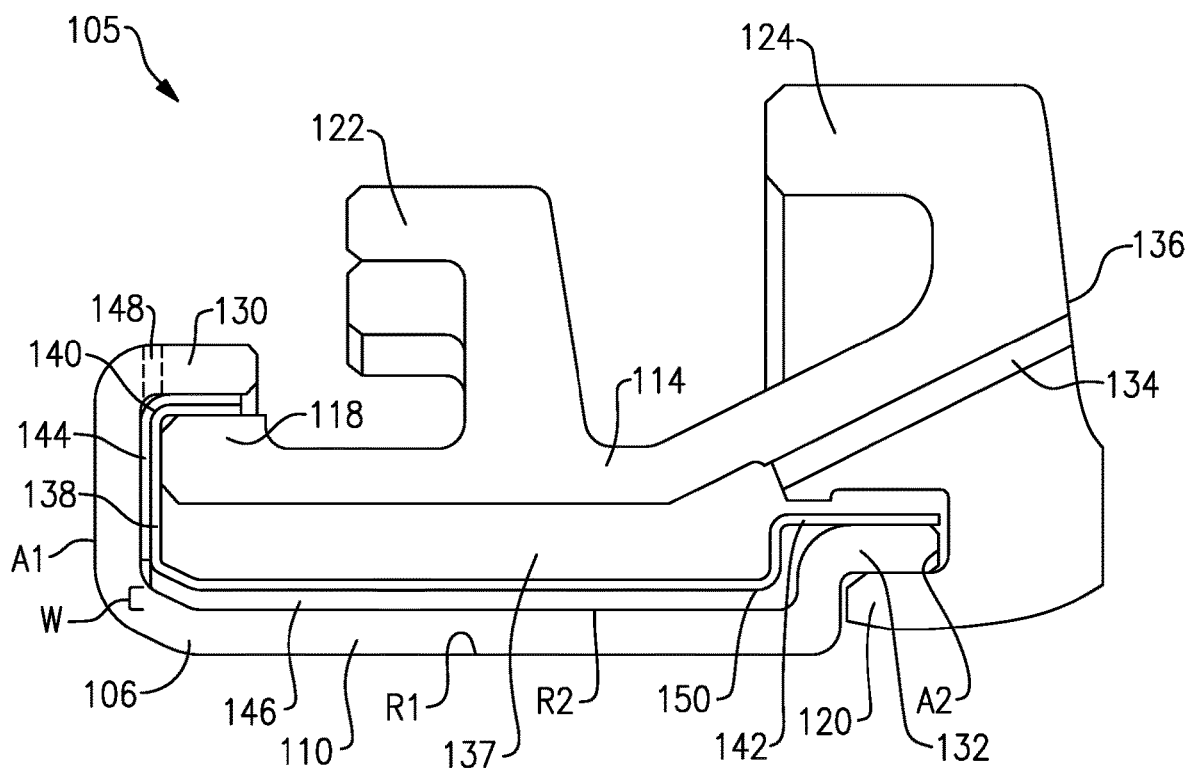
FIG. 4 shows a cross-sectional view through a blade outer air seal assembly.

FIG. 4 shows a cross-section of the blade outer air seal assembly 105. A hook 130 is formed in seal segment 110 of the BOAS 106 near the first axial side A1 for engagement with the first support member 118. The hook 130 is at a forward-most portion of the seal segment 110. The hook 130 includes a radially outwardly extending portion defining the first axial side A1 and an axially extending portion that extends aft of the first axial side A1. A lip 132 is formed in the seal segment 110 near the second axial side A2 for engagement with the second support member 120. The lip 132 extends generally axially from the seal segment 110. The BOAS may be assembled in a forward to aft direction, as the hook 130 and lip 132 will be received in the first and second support members 118, 120, respectively.

A cooling air reuse port 134 extends between a vane chamber 136 and a BOAS chamber 137. The vane chamber 136 is formed between the vane platform portion 116 and the engine structure. The BOAS chamber 137 is formed between the BOAS support portion 114 and the BOAS 106. Cooling air enters the BOAS chamber 137 through an inlet 148 in the BOAS 106, and may be reused to cool the BOAS 106 by travelling through the cooling air port 134. The support 112 may include a plurality of cooling air reuse ports 134 spaced circumferentially about the support 112. In one embodiment, the port 134 extends generally axially. In another embodiment, the port 134 may be a different orientation, such as generally radially, depending on the orientation of the hooks 122 and attachment member 124. For example, the port 134 may extend generally perpendicular to the axis A. The cooling air may be reused in adjacent vanes, which improves cycle efficiency. This allows for less total cooling air to be used than a non-reuse configuration. Further, cooling air from several BOAS may be reused to cool a single vane.

The port 134 re-uses cooling air that has been used for forced convection back side cooling of the BOAS 106 to cool an adjacent vane 104. The used air can then be used to cool the adjacent vane 104 reducing the amount of cooling air required to be supplied by the compressor, which may improve engine cycle efficiency.

A flow guide 138 is arranged between the BOAS 106 and BOAS support portion 114. The flow guide 138 generally tracks the shape of the BOAS 106. The flow guide 138 has a hook 140 and lip 142 that generally correspond to a hook 130 and lip 132 on the BOAS 106. The flow guide 138 forces convection along the radial surface R2 of the BOAS 106. A spacer 144 may be arranged between the flow guide 138 and the BOAS 106. The spacer 144 defines and maintains a radially extending space between the spacer 144 and BOAS 106. A gap 146 is formed between the BOAS 106 and flow guide 138 having a width w, which is defined and maintained by the geometry of the flow guide 138. Cooling air enters the BOAS 106 through a BOAS inlet 148, then travels radially inward through the spacer 144 into the gap 146. Cooling air exits the gap 146 through an outlet 150 in the flow guide 138, and through the port 134. Details of a flow guide 138 and spacer 144 are found in U.S. patent application Ser. No. 16/122,431, entitled "CMC BOAS COOLING AIR FLOW GUIDE" filed on even date herewith.

Figure 5:
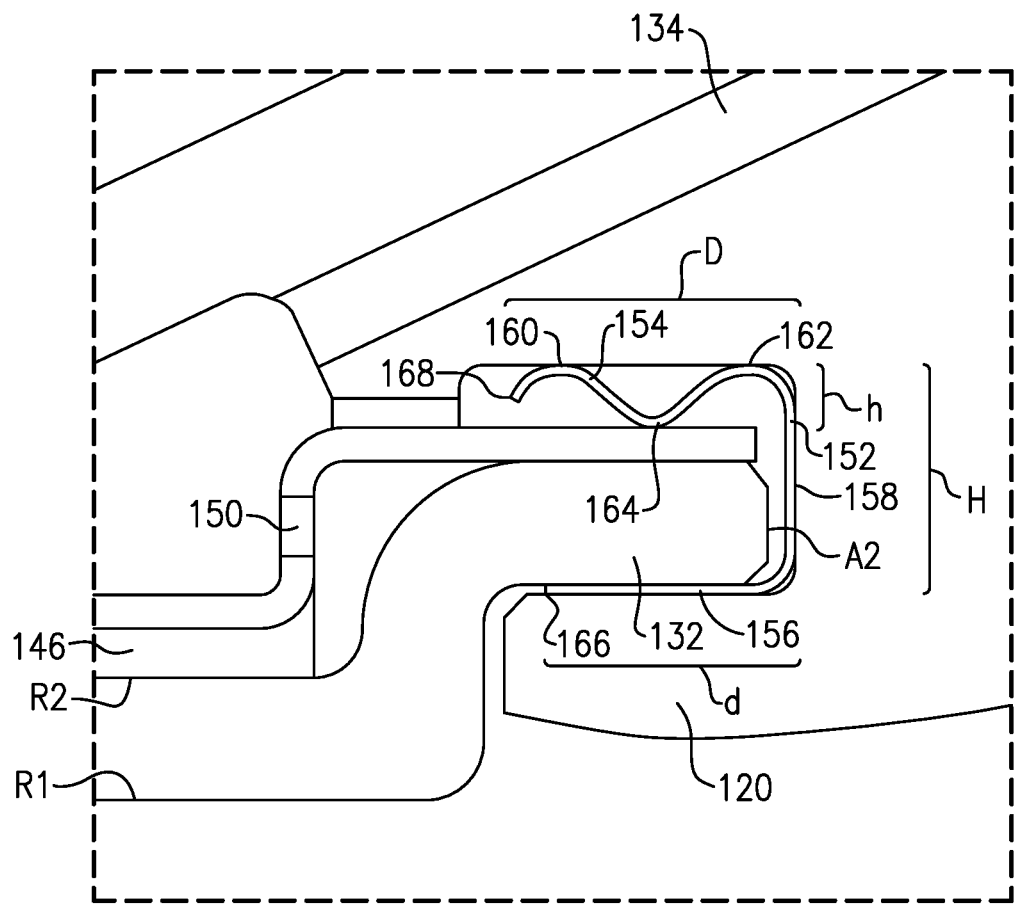
FIG. 5 shows a portion of the blade outer air seal assembly

FIG. 5 shows a portion of the BOAS assembly 105 with a seal structure 152. The seal structure 152 includes a seal portion 154 and a wear liner portion 156 connected by a radially extending portion 158. The radially extending portion 158 is positioned aft of the blade outer air seal 106, and the wear liner portion 156 and seal portion 154 both extend generally axially forward from the radially extending portion 158. The seal structure 152 is engaged with the lip 132, with the seal portion 154 arranged radially outward of the lip 132 and the wear liner 156 arranged radially inward of the lip 132. The seal structure 152 is a single unitary piece. The integrated seal portion 154 and wear liner portion 156 allows for reduced leakage, and may have a reduced cost. The seal structure 152 prevents wear on higher cost parts, such as the support structure 114. Although the seal structure 152 is shown at an aft end of the BOAS 106, the seal structure 152 may be used in other places, such as at a forward end of the BOAS 106.

The seal portion 154 is arranged between the flow guide 138 and the support structure 114, and has a wavy, or "mustache" shape. In the illustrated embodiment, the seal portion 154 is in contact with the support structure 114 at two radially outermost points 160, 162. In some embodiments, the seal portion 154 may include additional radially outermost points in contact with the support structure 114. The seal portion 154 is in contact with the flow guide 138 at a point 164 between the radially outermost points 160, 162. The seal portion 154 is designed to be compressed between the flow guide 138 and support structure 114 when the seal structure 152 is installed. That is, in a relaxed state, a height h between the points 160 and 164 is greater than the height h when the seal structure 152 is installed. That is, the seal portion 154 is compliant and is configured to compress upon assembly. The wavy shape of the seal portion 154 permits the seal portion 154 to be compressed when it is installed between the support structure 114 and the flow guide 138 to seal against cooling air. The seal portion 154 extends a distance D forward from the radially extending portion 158.

Some known turbine sections utilize wavy seals in a BOAS assembly. The present seal structure 152 incorporates the wear liner portion 156 with the seal portion 154 in a single piece. The wear liner portion 156 is flat and in contact with the lip 132 of the BOAS 106 and the support member 120 of the support structure 114. An end 166 of the wear liner portion 156 extends a distance d forward from the radially extending portion 158. In one embodiment, the distances D and d are about the same. In another embodiment, the distance D is larger than the distance d. That is, the seal portion 154 extends further forward from the radially extending portion 158 than the wear liner portion 156. In an embodiment, a compliance dimension aspect ratio of distance d to height h may be between about 0.2 and 1.0. In further embodiments, the ratio of d to h may be about 1:1 or 1:5. The radially extending portion 158 extends a distance H and connects the seal portion 154 and the wear liner portion 156. In one embodiment, an aspect ratio of the distance D to the height H is between about 1.0 and 2.0. In further embodiments, the ratio D to H may be about 1:1 or 2:1. The exact size and shape of the seal structure 152 is engineered for the particular application. In the illustrated embodiment, the radially extending portion 158 is in contact with a radial wall of the support structure 114. In another embodiment, the radially extending portion 158 may be in contact with the second axial surface A2 of the BOAS 106. In a further embodiment, the radially extending portion 158 may be in contact with both a radial wall of the support structure 114 and the second axial surface A2 of the BOAS 106.

The seal structure 152 is made from a metallic material, and may be formed from sheet metal, for example. The seal structure 152 may have a uniform thickness. In one embodiment, the seal structure 152 is made from a single ply of a ceramic matrix composite compatible material, such as a cobalt alloy. In another embodiment, the seal structure 152 is made from a multi-plied construction, and the ply that touches the ceramic matrix composite material is a ceramic matrix composite compatible material. For example, when the BOAS 106 is made from a ceramic matrix composite, the side of the seal structure 152 in engagement with the lip 132 will have the outermost ply made from a ceramic matrix composite compatible material, such as a cobalt alloy. The seal structure 152 may be a split ring construction, for example. The seal structure 152 allows for a ceramic matrix composite material part to be sealed against a non-ceramic matrix composite material part, such as a nickel part.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
a support structure;
a blade outer air seal extending circumferentially about an axis and mounted in the support structure, the blade outer air seal having a lip at an axial end engaged with the support structure;
a seal structure having a seal portion and a wear liner portion joined by a radially extending portion, wherein the seal portion is radially outward of the lip and the wear liner is radially inward of the lip, wherein the wear liner portion is flat in an axial direction and arranged between the support structure and the lip, and the wear liner portion is in contact with the support structure and the lip.

2. The blade outer air seal assembly of claim 1, wherein the support structure has a radially innermost portion configured to engage the lip of the blade outer air seal.

3. The blade outer air seal assembly of claim 1, wherein the seal portion has a wavy shape that is compressed between the support structure and the lip.

4. The blade outer air seal assembly of claim 3, wherein the seal portion has a relaxed height that is greater than an installed height when the seal portion is installed between the support structure and the blade outer air seal.

5. The blade outer air seal assembly of claim 3, wherein the seal portion has at least two radially outermost points that are in contact with the support structure.

6. The blade outer air seal assembly of claim 1, wherein the radially extending portion is positioned aft of the blade outer air seal.

7. The blade outer air seal assembly of claim 6, wherein the seal portion extends forward from the radially extending portion a first distance that is greater than a second distance that the wear liner extends forward from the radially extending portion.

8. The blade outer air seal assembly of claim 1, wherein the radially extending portion is generally flat and engages a surface of the support structure.

9. The blade outer air seal assembly of claim 1, wherein a flow guide is arranged radially outward of the blade outer air seal.

10. The blade outer air seal assembly of claim 9, wherein the seal portion is arranged between the support structure and the flow guide.

11. The blade outer air seal assembly of claim 10, wherein the seal portion is in contact with the flow guide.

12. The blade outer air seal assembly of claim 11, wherein the seal portion has two radially outermost points that are in contact with the support structure and an inner point in contact with the flow guide between the two radially outermost points.

13. The blade outer air seal assembly of claim 1, wherein the blade outer air seal is a monolithic ceramic material.

14. The blade outer air seal assembly of claim 1, wherein the blade outer air seal is a ceramic matrix composite material.

15. The blade outer air seal assembly of claim 1, wherein the seal structure is formed from sheet metal.

16. The blade outer air seal assembly of claim 1, wherein the seal structure is a cobalt alloy.

17. A blade outer air seal assembly, comprising:
a support structure;
a blade outer air seal extending circumferentially about an axis and mounted in the support structure, the blade outer air seal having a lip at an axial end engaged with the support structure;
a seal structure having a seal portion and a wear liner portion joined by a radially extending portion, wherein the seal portion is radially outward of the lip and the wear liner is radially inward of the lip; and
a flow guide arranged radially outward of the blade outer air seal, the seal portion is arranged between the support structure and the flow guide and in contact with the flow guide, wherein the blade outer air seal has a hook near a second axial end and the flow guide has a flow guide hook and flow guide lip, the flow guide hook engages with the blade outer air seal hook and the flow guide lip engages with the blade outer air seal lip.

18. The blade outer air seal assembly of claim 17, wherein a spacer is positioned between the flow guide and the blade outer air seal to maintain a gap between the flow guide and the blade outer air seal.

\* \* \* \* \*